Feb. 5, 1957 P. W. LEE ET AL 2,779,975
METHODS FOR MAKING COMPOSITE ELECTRIC CIRCUIT COMPONENTS
Filed Jan. 19, 1955
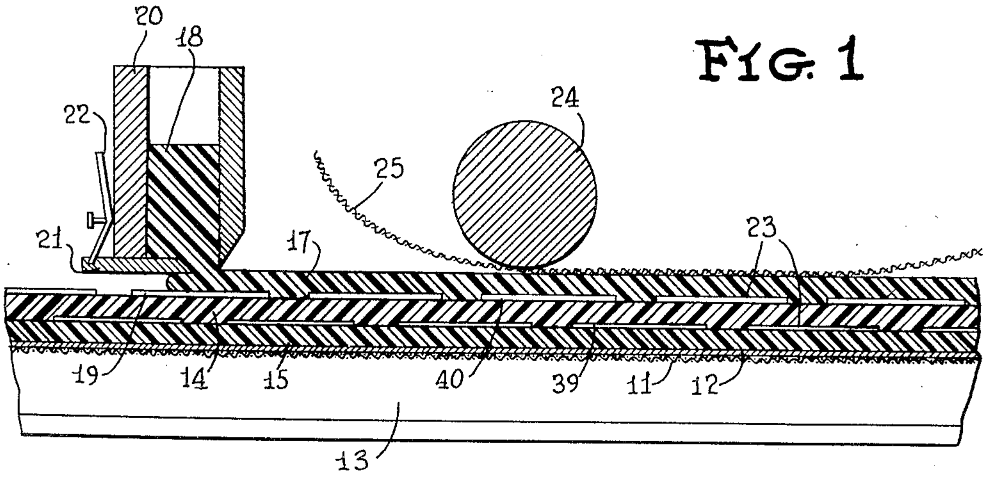
FIG. 1
FIG. 3
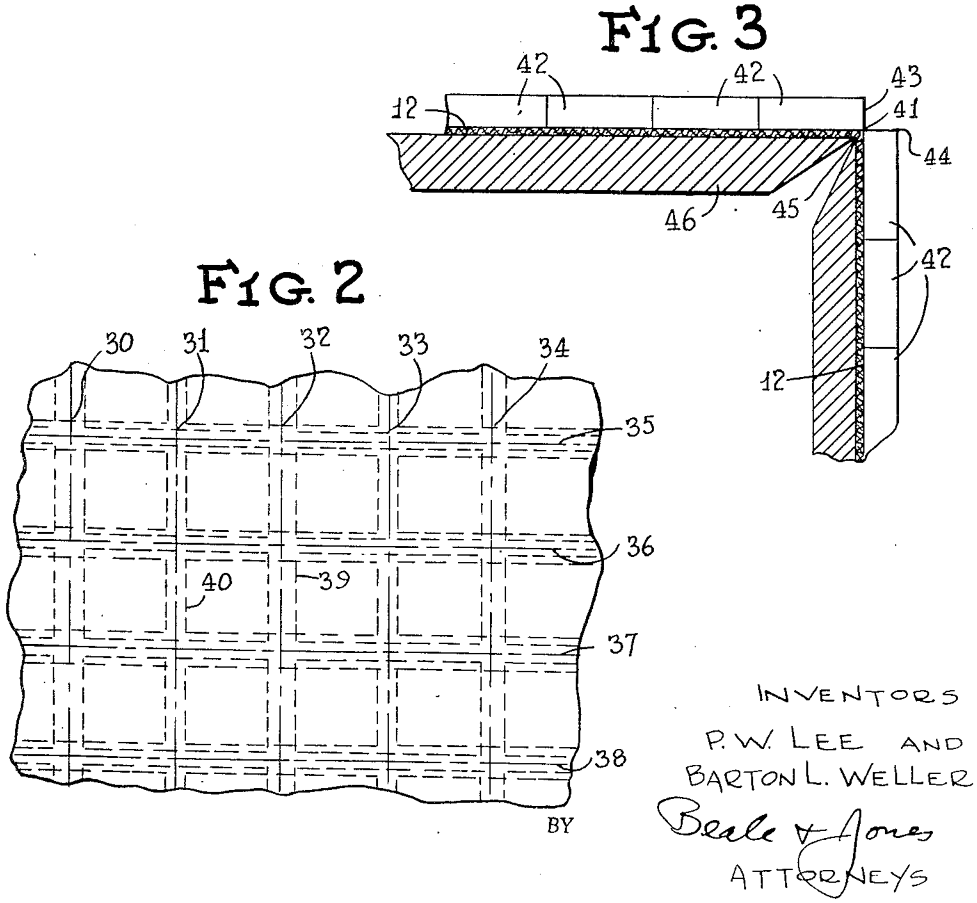
FIG. 2, FIG. 3
BY
INVENTORS
P. W. LEE AND
BARTON L. WELLER
Beale & Jones
ATTORNEYS United States Patent Office 2,779,975

Patented Feb. 5, 1957

2,779,975

METHODS FOR MAKING COMPOSITE ELECTRIC CIRCUIT COMPONENTS

Pyungtoo W. Lee, York, Pa., and Barton L. Weller, Easton, Conn., assignors to Vitramon Incorporated, Stepney, Conn.

Application January 19, 1955, Serial No. 482,852

18 Claims. (Cl. 18—47.5)

This invention relates to improvements in a method of manufacturing electrical components, particularly capacitors, inductors, resistors, thermistors, circuits, and combinations thereof. The components produced in accordance with this invention may be in the form of either individual elements, each composed of built-up layers, or a plurality of the foregoing components arranged in a desired pattern in a unitary structure composed of built-up layers and electrically connected to one another so as to perform a specific function when the unitary structure is incorporated in an electrical apparatus or system. Alternatively, one or more of the individual components or the groups thereof combined in a unitary structure may be formed within a single self-supporting piece or on and permanently secured to a permanent base to provide a control panel; a circuit; or an electrical system; such as, for example, a printed circuit, or other similar element of an electrical apparatus.

Particular properties of electrical components are obtained through the use of materials with various electrical properties. Such materials and their disposition and association in the component will cause the unit to have particular electrical characteristics. For example, these characteristics may be imparted by the electro-magnetic characteristics of the conductors and surrounding media, as in inductors; by the dielectric properties of the nonconductors, as in capacitors; or by particular association and interconnection of electrical conductors and nonconductors among themselves and with semi-conductors which are used as resistors, thermistors, or transistors and with magnetic matterials such as ferrites. To produce these properties under the most ideal conditions, in a minimum of space, it has been found desirable to embody layers of such materials mutually bonded into a continuous body.

To make a component of this type, the materials are handled as enamels, paints, pastes, suspensions, slips, or slurries which are mixtures of the materials in appropriate vehicles. These mixtures are formed into layers one over the other on either a temporary or permanent base. Prior to the principles disclosed in this invention, each layer was dried after being formed by evaporating with solvents through the application of heat, warm air, dry air, or combinations thereof, to the exposed surface of the layer. Such action removes the solvents from the vehicles and allows the resins therein to bind the materials into a solid film. The next layer is laid directly on the preceding one, dried, and the cycle repeated. The drying of the layers in the ways just outlined eliminates the solvent to such an extent that it leaves the layers in a porous discontinuous state in which particles are bonded together with resins, but in which interstices remain where gases can be occluded. When a layer is formed over a preceding one, the occluded gases are displaced by the fresh solvents from the new suspension and rise through the new layer, thereby causing a pinhole or void in the new layer. Such a pinhole may perpetuate itself through a number of layers. This phenomenon results in voids of various characters throughout the volume of the composite structure. Such imperfections result in unhomogeneity in the layers and cause them to be weak electrically, resulting in a defective unit. Therefore, this way of forming the layers reduces the production yield of acceptable units.

An important object of this invention is to secure a much higher proportion of perfect units than has been possible by previously available procedures. A further object of this invention is to prevent the formation of voids, striations, pinholes and similar imperfections in the body of these units by preventing the structure from becoming discontinuous during the build-up process. Another object is to speed the production of these units by providing novel methods of hardening the layers and the layer structure. Still another object is to increase the rate of applying these layers and reduce the complexity of equipment required to form them. Also, it is an object of this invention to improve the ease of finishing the units after they have been formed. Further objects and advantages of this invention will be apparent during the course of the following description.

The foregoing objects are accomplished by this invention, which, briefly, comprises the method of preparing an electrical unit of the type composed of layers of various materials each of which have particular electrical properties which include the steps of building up a plurality of layers of such materials by depositing suspensions thereof first upon a base member and then upon one another and hardening each layer before application of succeding layers while retaining part of the suspending medium which comprises the continuous phase of the suspension to prevent the layer from becoming discontinuous during the build-up process. The hardening of each layer is accomplished by any appropriate method; such as, for example, evaporation of solvent from any surface of the body under controlled conditions, removal of the suspending medium including both the solvent and dissolved solids content thereof by the application of an absorbent material to a surface of the layer, or by both methods or by polymerization or condensation of part of the vehicle. However, regardless of the method of hardening employed, it is essential at all times that the hardening operation be accomplished while retaining part of the suspending medium to prevent the layer from becoming discontinuous during the build-up process. The built-up layers may be used to form individual components or a combination of such components joined in a unitary structure; and, in either event, the structure produced may be separated from the base member employed during the building-up process, the removal therefrom being accomplished by any suitable method. The structure may, if desired, be subsequently secured to a permanent base after removal from the base member used in the building-up process. This invention may also be carried out by performing the building-up process on a base in a manner such that the structure becomes permanently secured to this base.

In the accompanying drawings forming a part of this specification, and in which like numerals are used to designate like parts throughout the same:

Fig. 1 is a diagrammatic cross-sectional view of a typical composite structure being built with methods described in this invention, Fig. 2 is a plan view of a portion of such a structure constituting a group of capacitors in process with boundaries of overlapping silver areas shown as dotted lines, cuts as dashed lines, and, Fig. 3 is a side view of pieces adhering to a flexible support after being built up and while the edges are being painted, trimmed or otherwise processed.

In Fig. 1 there are illustrated only two layers of insulating material designated by numerals 14 and 15, two layers of a pattern of conducting material 23, and one new layer of insulating material 17, shown being formed by the preferred one, of numerous processes which may be employed. It will be appreciated that the illustrated thicknesses of these layers are exaggerated for the purpose of illustration, as some layers are actually too thin to appear in the drawing if they were made to scale. The term layer, for the purposes of this invention, is defined as a sheet-like formation having a large area in comparison with its thickness. A number of layers of similar material formed successively, one upon the other, are, after formation, considered collectively as being a layer. Any particular layer in the foregoing defined sense may comprise a single area, a multiplicity of areas, a complex pattern of interconnected areas or a combination thereof when considered with respect to an adjacent layer. Each of these layers is formed individually in order that each will retain its electrical characteristics and that the integral geometry of the structure is well defined. The entire structure may be larger in area than an individual electrical unit as is shown in Fig. 2 and may be cut into separate units; such as, for example, on lines 30 through 38 as shown in Fig. 2, after the building-up process is complete. It may be desirable to form the structure on a surface different from a flat surface as is shown in Figs. 1, 2 and 3; such as, for example, a cylindrical surface may be used. The number of layers and their thicknesses will vary with the particular electrical and physical properties desired, and the five layers forming capacitors shown in Fig. 1 are merely illustrative. Furthermore, any one of the several layers of materials formed in any single structure may be composed of the same or of different composition than other layers.

The method of forming the layers will depend on the thickness desired. Usually, the conductors or semi-conductors are approximately .00001" to .001" thick and are complex patterns or continuous layers; therefore, these layers may be formed by any method capable of producing thin films; such as, for example, painting, printing or stencilling. The non-conducting, semi-conducting, magnetic, or ferro-electric materials or dielectrics are, generally employed in substantial thicknesses, usually about .001" to 0.10" thick. These two types of layers may be formed in any order even directly on the support 12, depending on the requirements of the finished electrical unit. Fig. 1 shows an insulating layer 15 on the support 12. A preferred method of forming a thick layer consists of spreading the suspension which has a fluid or plastic consistency over a surface 19, with a knife 16. The knife 16 is supported above the surface 19 by a distance equal to the thickness of the layer 17 to be formed. Fresh fluid suspension 18 is supplied in front of the knife 16 as it is moved relative to the surface 19 and parallel to it, thereby forming a layer 17 of substantial thickness over the surface 19. We have found that the arrangement shown in Fig. 1 makes it possible to form films of a wide range of substantial thicknesses at speeds greater than that possible with many other methods as, for example, by spraying. A hopper 20 is provided in front of the knife 16. A movable gate 21 at the bottom of the hopper 20 of the width of the layer 17 introduces fluid suspension 18 at the edge of the knife 16. The gate 21 is provided with a convenient lever 22 so that it can be easily opened and closed at the beginning and end of each layer. Through the use of this arrangement suspensions can be formed over previous layers as well as on the support 12. The suspension 18 from the hopper 20 is spread into layer 17 just before its viscosity sharply increases as a result of its liquids being partially absorbed by the previous layers 14 and 23. The foregoing method may therefore be employed to form layers of substantial thickness regardless of the type of material utilized in preparing the suspension.

By this invention these layers are formed and hardened without occluding gases which cause defective layers by creating voids and pinholes. This advantage is achieved by retaining part of the vehicle in the outermost layers during the building-up process so that all interstices between particles are filled with vehicle. The continuity within these layers is, therefore, maintained and gases will not be occluded within the structure. Hardening can be accomplished by controlling the vehicles, while retaining this condition, in a number of ways; such as, for example, by polymerization or otherwise chemically solidifying part of the vehicle, by evaporating part of the solvent, by applying an absorbent material to each layer as it is formed to remove a portion of the vehicle, by causing the vehicle to migrate to adjacent layers of substantially lower vehicle content, or by removing an excess of the solvent or vehicle by one or more of these methods and then returning solvent or vehicle to it in a controlled manner by exposing the structure either to solvent or vehicle vapors, or solvent or vehicle sprays. The preferred method of this invention for hardening each layer after it is formed consists of applying an absorbent material to the surface of the layer and, simultaneously, causing the vehicle to migrate to adjacent layers. It has been found that each layer can be hardened without occluding any gases through the application to each new layer of any fibrous or absorbent material 25; such as, for example, cloth, paper or sawdust. The layers will gain strength rapidly as the liquids are removed, and with the first application of absorbent material, sufficient liquids are drawn from the layer to give it strength enough to allow the absorbent material to be removed without marring the layer. Succeeding applications of fresh absorbent material will withdraw more and more liquids from the layer to establish the desired degree of hardness. We have found that an outstanding advantage of this method is the fact that the liquid content of the absorbent material and that of the layer come to equilibrium with each other so that, at no time, is the layer dried to such an extent that it becomes discontinuous or porous. Therefore its ability to transmit liquids is not impaired; also, the outermost portions of the layer have the same liquid content as the inner portions of the layer, and therefore the layer is saturated with the liquid phase. Each layer can thereby be uniformly increased in hardness to a point where it has sufficient strength to receive another layer, but at no time during the build-up process are all the liquids removed. Succeeding operations are not inhibited by occluded gases and the previously formed damp layer is receptive to the vehicles in the new layer being applied. The vehicle in each successively applied layer passes into the absorbent material, and as well, passes into the previously formed layers with the result that an equilibrium is maintained throughout the entire structure, wherein at no time is sufficient vehicle removed to produce a discontinuous or porous body. The structure is thus homogeneous and free of porosity which introduces flaws in the finished product.

When the fluid suspension is applied to a fluid-impervious temporary support, to a permanent base member or to a preceding formed layer, the physical condition of the newly formed layer is such that it flows readily and is capable of levelling off. Upon being hardened by one or more of the foregoing methods described, the physical condition of the layer is changed so that the layer will no longer flow; and, thus, the layer becomes immobile. In such a hardened layer the particles of the material which were dispersed in the fluid suspension are homogeneously distributed throughout the layer. Each particle therein is in contact with adjacent particles. The particles, thus, support one another and are not suspended in the liquid vehicle employed in the fluid suspension. If a temporary binder is employed in the fluid suspension, which is preferred, this binder causes the particles in the layer, after it has been hardened, to become firmly secured to one another. This immobile structure composed of particles having specific electrical properties has, as previously stated, many interstices between the particles. These interstices are completely filled with the liquid vehicle which was employed in the fluid suspension and the immobile layer is thus saturated with the liquid vehicle. This condition is maintained constantly during the entire building-up process; and, as a result, it is impossible for any gases to become occluded at any point within or out of the hardened layers. The hardened layers, while immobile, are fragile and in a condition such that it is not possible to lift them from the support nor is it possible to handle or otherwise manipulate the layers apart from the support upon which they are formed immediately after hardening them. The built-up layers must be thoroughly dried to make it possible to handle them as hereinafter described.

We have found that the building-up process can be considerably accelerated by building the structure on a support, designated by numerals 11 and 12, which can transmit liquids. Such an arrangement allows controlled removal of solvent from the supported side of the structure. Since this side is not receiving new layers, its solvent content is not as critical to the homogeneity of the structure so the solvents are evaporated from the outside of the porous support with dry and/or warm air, in space 13, or with other convenient means, though at all times sufficient vehicle is retained in this layer to render it non-porous. The migration of solvents through the structure and thence through the porous support 11 and 12 will permit removal of solvent from the structure at a controlled rate from the lowermost face thereof. This rate can be adjusted so that the desired amount of vehicles exists at the topmost layer and a smaller portion exists adjacent the support. Such a system permits the removal of solvent from the structure to proceed while the building-up process is under way, thereby considerably increasing the rate of production of the structure. Also, the average liquid content of the composite structure is lowered so that its average strength is greater than if it were not tempered in this manner. While this method of controlling the solvent or vehicle content of the structure may be adequate in and of itself, it is preferred to employ this method in conjunction with absorbent materials applied to the surface of each newly formed layer as more fully discussed above. After the structure is finished, it is then completely dried preparatory to handling, baking or firing. With the porous support, it dries from both sides and warping is maintained at a minimum.

Furthermore, we have arranged for the support 12 to serve an additional very important function. It preferably allows the transmission of solvents during the building-up operations and while the structure is being completely dried after the building up is complete, as previously described. The support 12 may be a flexible layer such as paper, cloth, or other flexible foraminous supporting material, but if it is not necessary to transmit solvent through this supporting material, it may be formed of a solid flexible sheet; such as, for example, metal foil, metal sheets, plastic film, plastic sheets, or the like. The composite structure adheres to this sheet even after the structure is thoroughly dried, thereby holding the pieces 42 shown in Figure 3 in their original juxtaposition even after the composite structure proper is cut into separate pieces. By bending this sheet of pieces along a particular cut line 41, the edges of two rows 43 and 44 of pieces bounding this cut 41 will be exposed as shown in Figure 3. The exposed edges can thereby be conveniently painted or trimmed or otherwise processed without handling each piece individually. If desired, the support may be cut along any line to convert the sheet into groups of units to make particular edges completely accessible. Furthermore, this support 12 may conveniently be formed of an organic substance; such as, for example, cloth or paper, so that it can be burned off when the pieces are subsequently fired or baked to set the materials into a homogeneous body. The composite structures may, of course, be removed from the support 12 and then fired or otherwise treated to unify the layers.

Alternatively, the composite structure may be removed from the support merely by separating the composite structure from the support 12 upon which it is formed either after firing or otherwise treating the structure to unify the layers thereof as disclosed herein, or before the unifying step, if the structure has been thoroughly dried so that the resinous content of the vehicle binds the particles together. If the composite structure is formed upon a support composed of metal foil, metal sheeting or other material which either cannot be burned off, or does not burn off completely, at the temperatures employed to fire or bake or otherwise transform the materials of the composite structure into a homogeneous body, it is preferred to separate the composite structure from the support 12 merely by removing it therefrom. If desired, the support 12 may be provided with a coating of a lubricant; such as, for example, a film of bentonite, graphite, or of any one of the lubricants commonly applied to molds including mineral or vegetable oils, waxes and greases, fatty acids, fatty acid esters and soaps, to facilitate removal of the composite structure from the support 12. The utilization of the support 12 in the above described manner considerably reduces the time required to perform the finishing operations.

A further alternate may be that of providing for the composite structure to remain permanently on its supporting base. This permanent base may be chosen to meet the requirements of both the laminating processes as previously described and the end-use application of the structure. The structure may be permanently appended to the base whether porous, flexible, rigid or combinations thereof. This invention can be used to build-up the composite structure on these permanent bases and subsequently to adhere the structure to the permanent base by fusion, adhesion or other method compatible with the materials used. This adhesion step may or may not be performed concurrently with the process which unifies the composite structure.

By this invention, it is possible to increase the efficiency of producing electrical capacitors of high quality with vitreous enamels and silver by both reducing the number of defective units and speeding the fabricating process as will now be specifically described. The suspensions of these materials are built up over a large area which contains a number of single capacitors. After the entire structure is built, it is cut into pieces forming each capacitor, and the assembly completely dried under controlled conditions to produce rigidity. While being held on the flexible base, the individual pieces are painted with silver to provide appropriate terminals and connections to internal conductors. The pieces are then fired to burn off the base, to vitrify the ceramic, to coalesce the silver, and to convert the body to a monolithic block.

In forming these capacitors the material preferably used for the dielectric is a fritted vitreous enamel. The inorganic parts of one such material are:

| | Percent by weight |
|---|---|
| PbO | 53.2 |
| $SiO_2$ | 27.1 |
| $K_2O$ | 2.6 |
| $Na_2O$ | 1.6 |
| $LiO_2$ | 0.7 |
| NaF | 4.5 |
| MgO | 3.6 |
| SrO | 6.7 |

These constituents are handled in a manner common to the art; namely, mixed and then melted at temperatures from 1000° C. to 1200° C. to convert the mixture to a fluid. This fluid is then poured into water to cool it rapidly and form a coarse frit. This frit is then ground to a powder. Such grinding is conveniently done in a ball mill where some of the constituents or the organic vehicles are added to carry the frit.

After the frit is ground to a particle size which will give a homogeneous body in the finished piece, the remaining parts of the vehicles can be added to the mill and the grinding continued to mix all the components thoroughly. The vehicles commonly used contain these typical parts:

| | Percent by weight |
|---|---|
| Turpentine | 83½ |
| Hydrogenated rosin | 12 |
| Ethyl cellulose | ½ |
| Methyl ester of abietic acid | 2 |
| Diethyl oxalate | 2 |

In preparing the foregoing fluid suspension, it is preferred to employ from 20% to 30% by weight of vehicle in the suspensions and 80% to 70% by weight of inorganic material therein. Such a suspension is of fluid and plastic condition whereby layers thereof may be formed by the methods and apparatus above described.

The conduction areas, constituting the electrodes of the capacitors and the connections within the capacitor structure, are made with silver. This metal, in either powder or flake form is used; the latter having better conductivity after coalescing. For silk screen printing, the powder is mixed with a medium in either a paint or colloid mill. A common medium is:

| | Percent by weight |
|---|---|
| Cellosolve | 85 |
| Ethyl cellulose | 5 |
| Hydrogenated rosin | 10 |

It is preferred to employ from 30% to 50% by weight vehicle and from 70% to 50% by weight of silver for use in silk screen printing, however, these proportions may be varied according to the requirements of the particular depositing method employed.

The member 11, shown in Fig. 1, on which the structure will be built may be constructed to allow the passage of solvents being removed from the under surface; and, in this event it is made of screens or perforated plates. In order that the top of this member be smooth and not create a rough surface on the bottom of the capacitors, the uppermost screen is fine, of the order of 150 mesh. This screen is supported by successively larger mesh screens or perforated plates to produce a rigid support; for example, 30 mesh, 10 mesh, and 2 mesh. This stack of screens or perforated plates is positioned over a channel 13 through which warm air can be forced at a controlled rate to evaporate liquids from the bottom of the structure, if desired.

To prevent the first layer from flowing into the screen mesh and adhering to it, making it impossible to separate the two, the screen is covered with a base material 12, such as formed film, thin paper or fine cloth, which will transmit the solvents, and subsequently hold the pieces in position. This material 12 is first wet by vehicle alone and produces intimate contact between the material 12 and the screen mesh 11, so that it will not creep or move during the subsequent building-up process. This porous layer 12 adheres to the finished structure holding the pieces together, and may be burned off during the firing operation or otherwise separated by removal therefrom as has been described above.

The first layer is formed with the knife 16 and the hopper 20 containing vitreous enamel suspension 18. The hopper 20 is filled with enamel suspension 18 while the gate 21 is closed. The contacting edges of the gate 21 and the knife 16 are wiped clean because any enamel suspension adhering outside this aperture will cause an uneven film to be formed. The knife 16 is then placed above the surface to receive the layer by the distance essentially equal to the thickness of the desired layer. The gate 21 is opened by pressing the upper part of the lever 22 against the hopper and the knife is moved relative to the surface in the direction toward the hopper to spread the enamel suspension over the surface. Guides may be used on either side of the area receiving the layers to support the knife. These guides can be shimmed upwardly to space the knife 16 for each successive layer. Other arrangements may be used with equal success to maintain the relationship of the knife and the surface during the casting operation. For example, the knife may be separately supported at the correct height and the surface moved under it. Just before the end of the layer is reached, the gate 21 is closed by pressing it toward the knife. Closing the gate 21 stops the flow of enamel 18 and the layer is terminated.

As previously described, the layer is hardened and tempered by applying a dry cloth 25 to its exposed surface. The cloth is lightly pressed with an applicator such as a brush or roller 24 to insure intimate contact between the cloth and the layer. Small amounts of pressure applied to the roller 24 also increases the density and homogeneity of the layer 17. The amount of pressure exerted by the roller 24 is less, however, than that which will cause deformation of the layer. Subsequent applications of dry cloths or paper follow until the film is hard. From four to five sheets of high wet strength paper are applied to the layer sequentially. We have found that the desired degree of hardness is obtained when about 35% by weight of the original vehicle is removed. The absorbent material initially applied to the layer removes about 0.15 ounce of vehicle per square foot of laminant. The desired tempering and hardening of the layer is accomplished when from 25% to 60% by weight of the solvent vehicle is withdrawn therefrom though it is preferred to remove from 30% to 40% by weight of the vehicle and a removal of about 35% by weight thereof represents the optimum operating condition attainable as mentioned above. While forming the first few layers we have found that it is not desirable to remove the solvent too rapidly from the structure from beneath through the porous support 11 and 12 or too much solvent may be removed from the top layer by migration through structure to the bottom layer and evaporation therefrom. After about .050″ or more of layers are formed, controlled removal of solvent by the passage of air through the space 13 is used to strengthen the structure further and supplement the hardening accomplished by absorption. The production rate is increased by using absorbent materials on the exposed surface of the layer in conjunction with controlled removal of solvent through the support.

After the first layer is hardened as described, another layer can be formed over it with no occluded gas resulting. The knife 16 is raised above the surface of the first layer by the amount required to form the new layer and the enamel suspension in front of the knife is then spread. This second layer is hardened by successive applications of absorbent cloths or paper sheets and vehicle migration into the adjacent layer. Any desired number of such enamel suspension layers can be applied to create a layer of the desired thickness.

With the bottom dielectric formed, silver electrodes are printed on the layer. Silk screen printing, which is a common art, is used and the silver paste is deposited directly on the layer. The paste will bond with the layer and the silver layer is thin enough so that the liquids in it quickly come to equilibrium with the liquid content of the layer essentially by migration of the liquids in the printing paste into the preceding layer. The next layer of enamel suspension is deposited directly over the silver layer and uncovered portion of the preceding enamel layer and no difficulty with occluded gases is found, since the silver has the same liquid content as the enamel.

Such applications of enamel suspension layers and silver suspension layers are repeated in the proper sequence to construct a composite structure of conducting areas and dielectrics to form the capacitors. We make the printed pattern of the silver suspension such that alternate areas come to opposite ends of each piece which is cut from the larger structure, as illustrated by areas 39 and 40 as is shown in Figs. 1 and 2. In Fig. 2 silver areas on one layer are shown larger than those on the other layer in order that the relationship of the two patterns can be clearly displayed.

We may vary the geometry of the printed silver patterns and the order of printing them to accommodate particular requirements. For example, frequently the pattern is not composed of separate individual areas, as shown in Figs. 1 and 2, but may be interconnected areas in which silver bands form particular terminations of the electrodes perhaps on more than two edges, or interconnection between a number of electrodes. Also, the areas may be not only rectangular in geometry, but of any desired figure. Furthermore, different patterns may be used in different layers to provide more than one electrode and circuitry on particular layers. Similarly, it is frequently desirable to place silver suspension on the bottom or top of the pieces to provide connecting points, terminals, or interconnections. In such a case, the first layer and the last layer are printed patterns.

After the desired structure has been completed, it can be cut easily into individual pieces. These cuts will intersect alternate silver areas at each end of each piece to make possible connections to alternate electrodes at opposite ends of each capacitor as is shown in Figure 2. Such cutting is conveniently done with a thin blade, such as a razor blade, and only the composite structure is cut and not the support 12. Since the structure is still of the consistency of partially set putty, and since a large portion of the vehicles remain in the structure, in spite of solvent removal through the base and by means of absorbent members applied to the top surfaces as each layer is formed, it must be dried under controlled conditions and the resins set to bind the structure into rigid members that can be handled. Depending on the size of the pieces this drying may be done in an oven in which the temperature rises approximately ten degrees per hour. The drying can be carried to about 200° C. where all the volatiles are driven off and the entire structure is dry and rigid. The capability of drying the structure both from its exposed surface and through its support considerably increases the rate of drying and minimizes the warping and cracking of pieces.

When the resin content of the vehicle sets, the pieces remain in their original position, being held by the flexible support 12. This composite structure is put on a platform 46 having a sharp break line 45. The sheet of pieces is moved so that one row of pieces is on the right side of the break, as viewed in Fig. 3, and so that the first cut through the silver electrodes is coincident with the break. The support 12 can then be bent along this cut as the right side of the platform 46 is lowered 90° and edges 43 and 44 exposed. Silver paste can be painted on these edges to contact the electrodes inside the piece and bond to the edge enamel of the piece. This edge silver may also connect those electrodes to a silver area on the bottom or top of the piece. After painting the pieces bounding on one cut, the right side of platform 46 is lifted, the sheet of pieces again moved over the platform 46 to make the next cut coincident with break 45 and the operation repeated.

After edge silvering, the pieces are fired at about 700° C. on plates coated with an inert material such as calcined bentonite in a manner common to the art. This fire burns off the support, vitrifies the enamel, and coalesces the silver to make complete electrical capacitors of high quality. Each unit shrinks, thereby separating it from adjacent units. The capacity of each unit is dependent upon the electrode area, the thickness of the dielectrics between the silver, and the number of active dielectrics.

The invention comprising the method which has been disclosed herein may be employed to produce electrical components of a wide variety of types, as has been previously indicated. The invention has been described in connection with the production of capacitors but the principles of this invention are equally applicable to the production of other electrical components such as those which were previously enumerated herein. The capacitors may be individual separate elements composed of a plurality of built-up layers and the other electrical components which may be produced by this invention may likewise be separate, self-supporting units. The capacitors and similarly constructed electrical components may be combined in a single unitary, self-supporting structure composed of a plurality of built-up unified layers. The various elements of such a structure may be arranged and disposed therein in any desired pattern. Such a combination of multiple elements, as well as the electrical interconnections therebetween and the electrical terminals for the entire structure, may all be formed simultaneously by this method.

The principles of this invention which have been described above may also be employed to produce individual electrical components or combinations thereof forming a complete electrical system which are permanently secured to a supporting base member. The method employed to produce these structures is identical with that described for forming self-supporting structures. It may be desired to adhere groups of capacitors to a permanent support to retain their juxtaposition. In the case of the vitreous enamel capacitors described, these units may be fused to the base during the firing operation in which the multiple layers thereof are unified. In this manner it is possible to provide metallic, ceramic or other bases which carry one or more capacitors and such a structure facilitates the mounting of these parts in electrical equipment. Such bases are important to plug-in equipment assembly and can provide a rigid support for one or more capacitors which may be easily inserted into or replaced in an electrical system. These structures may also include electrical components which provide resistance and inductance as well as capacitance. This method can be carried out to produce complete systems of the foregoing elements; and, as well, thermistors, transistors, photosensitive elements or other components, the construction of which is a plurality of built-up layers of unified materials is desirable. Thus, it is possible to create an assembly of interconnected components upon a permanent base which assembly either is or is similar to what is commonly known as a "printed-circuit."

In applying the principles of this method to prepare an assembly of electrical components on a permanent base, according to one embodiment of this invention, a suitable base member is first provided. If a ceramic base is to be employed, the base itself may be prepared by this method. Thus, a plurality of layers may be built-up until a base member having the desired thickness and ultimate strength and rigidity is formed. In forming such a base member the vehicle content of each layer is adjusted as has been previously described so that the interstices between the solid particles of the layer are filled with the vehicle and the layer thus saturated with vehicle to prevent the occlusion of gas at any point within the layer. When the base member has been built-up, as described, the electrical components then may be formed thereon by this method. Thus, layers of insulating materials may be applied to the base member by applying suspensions or dispersions of the insulating materials in a vehicle by this method. In this building-up process, layers of conducting, semi-conducting or magnetic materials may be introduced between the layers of insulating materials by this method in the various areas wherein the different components are being formed. Simultaneously, the electrical interconnections between these various components and the electrical terminals for the entire structure may be formed in this method. When the various components and the electrical connections associated therewith have been built-up, the entire structure may be unified as previously described. In the case where the insulating materials employed are ceramic, the built-up structure may be fired and the components and associated electrical interconnections are fused to the base member as all of the multiple layers of these elements and the base are thus unified. It may be desirable to form the base member upon a temporary support to facilitate the control of the vehicle content of the layers during the building-up operation. The entire structure including base, components and interconnections is, however, separated from such a temporary support by any of the methods previously described for separating these members after the entire building-up operation is completed. Thus, the base member with the components and interconnections therebetween may be treated to unify the multiple layers thereof while supported by the temporary base or support; and, if a combustible temporary support is employed, the latter will be eliminated during firing or similar treatment. On the other hand, it is possible in certain instances, i. e., after completely drying the structure, to remove the permanent base with its attached components and interconnections from the temporary base member and thereafter subject the structure to the necessary treatment for unifying the multiple built-up layers therein. The treatment for unifying the built-up layers may be firing, as in the case of where ceramics are used in the building-up operation. Heating or baking may be employed if the multiple built-up layers are formed of materials which may be thus unified. For example, heating or baking may be employed to drive off the solvents of the vehicle when a synthetic resinous material is dissolved or dispersed therein and the synthetic resinous materials forming the layers are each solidified and unified with one another. In this type of a process the particles coalesce and then are bonded as the hardening takes place. Heating and baking may also cause the multiple-layer structure to become unified by causing a chemical reaction in the synthetic resinous materials employed in the dispersions used in the building-up operation. Thus, the resin-forming constituents in the dispersion may be polymerized, condensed or oxidized by heating with or without the use of catalysts in the customary manner to unify the multiple layers in the structures.

The permanent base to which the components and the electrical interconnections are permanently secured may be preformed in any desired shape from a variety of different materials. Various types of metal in sheet or other form may be used. Synthetic resinous bases may be used in many instances, and such bases may consist of phenol-formaldehyde or urea-formaldehyde resins, polystyrene resins, polyester resins or the like. Hard synthetic rubber of vulcanized natural rubber sheets and insulating composition fiber sheets wherein the fibers are suitably bonded may also be used as the permanent base for the electrical components prepared by this method. These permanent base members may be positioned under the hopper 20 and the multiple layers of the desired compositions are then built up in the manner previously described herein. When the desired electrical components have been built-up on the surface of the permanent base member; and, as well, the electrical interconnections therebetween formed, the multiple layers of the build-up may then be unified in the appropriate manner. If ceramics are employed in the dispersions used in preparing the multiple layers of the components and such components are formed upon a metallic sheet, the components may be fired to unify the multiple layers; and, at the same time, fuse the layer in contact with the permanent base, thus permanently securing the components and interconnections to the base member. In the event the permanent base is formed of a synthetic resinous material, hard rubber or fiber board, the insulating material in the suspension employed in the building-up process must be capable of being unified into a monolithic structure under conditions such that the permanent base is not damaged during unification. Ceramic insulating materials which are unified by firing may be employed when the suspensions thereof for forming the multiple layers are applied to a ceramic or metallic permanent base. Synthetic resinous insulating materials should be used in the suspensions applied to a permanent base composed of a synthetic resin, hard rubber or composition board and such synthetic resinous insulating materials should be capable of being unified at temperatures below that at which the material forming the permanent base would be damaged. Alternatively, the electrical component or an interconnected group of electrical components may be formed upon a temporary base; and, after the multilayered structure has been completely dried or converted into a monolithic structure and separated from the temporary support, the unified structure may then be secured to a permanent base in any suitable manner. If the structure has been completely dried, it may be placed upon the permanent base and converted into a monolithic structure, at which time the structure becomes affixed to the base. Alternatively, the structure may be converted into a monolithic self-supporting structure and this then secured to a permanent base. Various types of adhesives may be employed to secure these preformed self-supporting structures to a permanent base; such as, for example, cellulose derivatives and synthetic resinous thermoplastic or thermosetting adhesives. Cements such as dental cements may also be used and metal alloys having low melting points may be used. The preformed self-supporting structures and the permanent base may also be secured to one another by fusing one of two elements to be secured thus forming a strong bond therebetween.

It is readily apparent from the foregoing discussion that in forming layered electrical components a variety of alternative manipulative steps may be employed in conjunction with the method of build-up comprising the principal feature of this invention. Thus, the building-up of the layers of an electrical component or a system of interconnected components is performed upon a support which may be either a temporary or permanent support. If a temporary support is employed in the building-up of the layered component, the latter is separated from the support either before or after the layered component has been converted into a monolithic structure as described. A temporary support may be formed of a material which may be destroyed, as by burning, during the conversion of the build-up into a monolithic structure in order to separate the latter from the support. If the temporary support is composed of material which is not destroyed during the conversion of the layered build-up into a monolithic structure, the latter is merely physically removed from the support. The electrical components formed upon temporary supports of either of the foregoing types may be used as electrical components immediately after conversion into a monolithic structure and separation from the supporting member or, alternatively, such components may then be secured to a permanent support by means of adhesives, or cements, or by fusing the components to a permanent supporting member along a surface of the component contiguous to the permanent supporting member. Finally, it is within the purview of this invention to build-up a layered electrical component or a plurality of interconnected layered electrical components directly upon a permanent support. When the build-up is completed, the multiple superimposed layers are converted into a monolithic structure; and, simultaneously, are permanently secured to the supporting member employed in the building-up operation.

The preparation of assemblies of electrical components adhered to a permanent base by this method permits the introduction of layers of conducting, semi-conducting or magnetic materials between the layers of insulating material in any desired pattern. An example of one such device produced by this method is, in effect, a panel upon which instruments are held. The electrical connections in the multiple-layers which are secured to the panel provide the circuitry. The multiple-layers may also have, at appropriate places, the desired electrical elements such as resistance, inductance and capacitance. An outstanding advantage of the products obtained by this invention is that the multiple-layers can contain complicated systems. Thus, insulated conductive layers may cross over one another in various planes in the multiple-layer structure. Conductive layers or layers of magnetic materials may be interposed between or formed on insulating layers at any desired point in the structure to shield certain portions of the panel from other portions thereof.

Numerous applications of the panels described are obvious. Electronic devices such as radios or photoelectric relays may have their circuits and necessary related components built on the chassis by this method. Aircraft frame members may carry conductors on their surface for power or communication transmission purposes within the aircraft. These and other applications demonstrate the tremendous advantages which this invention makes possible in providing means for making electrical components or combinations thereof of unified multiple layers which are permanently secured to a base member.

In describing a specific application of the method comprising this invention in connection with the formation of capacitors, the use of vitreous enamel and powder or flake silver suspensions has been described. Other nonconducting and conducting or semi-conducting materials or other materials having special electrical or magnetic properties may be employed in carrying out the principles of this method to prepare capacitors or other electrical components. For example, suspensions may be made of refractory materials and suspensions of gold, rhodium, palladium, platinum or similar metals and these suspensions which are in a fluid or plastic state may be deposited in any desired relationship by the method described above and hardened in the novel manner disclosed herein. In addition, suspensions of organic materials may be employed in lieu of vitreous enamel or other inorganic materials; such as, for example, partially condensed phenol-formaldehyde resins, partially polymerized vinyl resins, mixtures of monomeric and polymeric acrylic and substituted acrylic resins, tetrafluorethylene suspensions, nylon suspensions, polystyrene suspensions, and other suspensions of synthetic resinous materials capable of coalescing upon removal of the suspending solvents or chemically hardening by polymerization or condensation reactions into continuous sheets. Finally, it is possible to employ fluid, plastic suspensions of carbon particles.

To illustrate further, by utilization of the principles of this invention, tetrafluorethylene may be used as a capacitor dielectric in the following manner. A suspension of tetrafluorethylene containing a small amount of organic binder consisting of solvents and a resinous material with the tetrafluorethylene can be spread in the manner described. The layer can be hardened by the methods herein disclosed while still retaining the continuous nature of the layer. Silver suspended in resins and solvents compatible with the tetrafluorethylene vehicle can be printed in the hardened layer. This procedure can be repeated in essentially the same way vitreous enamel and silver are built up. The completed structure will be unified into an electrical body by baking it at temperatures at which the tetrafluorethylene particles bond into continuous layers. The vehicles must be so chosen that they volatilize or burn at temperatures lower than that necessary to bond the tetrafluorethylene in order that no products of combustion or volatiles are entrapped to create voids. The silver will be bonded into continuous layers in a manner closely related to the methods of applying conducting coatings to common plastics. A minimum of binders in the silver must be allowed to remain after baking in order that the conductivity of the silver will be a maximum.

Similarly, partially condensed phenol-formaldehyde resins can be used to make composite electrical bodies. Using the layering methods described above, the layers might be hardened by removing part of the carrier solvents, such as one of the ketones. After the structure is built up, the condensation of the phenol-formaldehyde can be completed by baking in the conventional manner to bond the layers. Again silver, carbon or semi-conducting layers, to form electrodes, can be cured simultaneously while the entire body is being baked. In general such materials as the phenolics, which condense at lower temperatures than those at which ceramics fire, require special consideration to improve the conductivity of the conducting areas used with the phenolics.

Through applying the principles of this invention and appropriate materials, wide varieties of electrical components and combinations of components on permanent or temporary bases can be made on a mass production scale not previously achieved. Complete electrical systems can be produced by these methods. For example, the pattern of the conducting materials may be such as to provide a number of capacitors and interconnecting circuit elements within a single unit. Carbon resistors on the surface or inert metallic resistors within the units can be part of these systems. Inductive elements and coils can be incorporated at will in these structures, while magnetic materials can be included to increase the permeability of portions of the bodies containing such inductive elements. The appropriate juxtaposition of any of these materials as well as others with particular properties will create electrical units of predetermined characteristics to meet specific requirements.

It will thus be seen that there are provided a method and device which achieve the several objectives of this invention and which are well adapted to meet the conditions of practical use.

As various possible embodiments might be made of the above invention and as various changes might be made in the embodiments above set forth, it is to be understood that all matter herein set forth or shown in the accompanying drawing is to be interpreted as illustrative and not in a limiting sense.

This application is a continuation-in-part of our application Serial No. 174,496, filed July 18, 1950, now abandoned.

We claim:

1. The method of preparing an electrical unit comprising a composite body including a plurality of layers of materials having specific electrical properties which method comprises building up a plurality of superimposed layers of fluid suspensions, in liquid vehicles, of particles of a material having specific electrical properties, the first of said layers being applied to a support and each succeeding layer being applied to the preceding layer formed, adjusting the liquid vehicle content of each layer to the point of saturation of said layer with said liquid vehicle after it is formed and before applying a succeeding layer of a fluid suspension to produce an immobile layer of said particles dispersed in said liquid vehicle, said immobile layer of particles having interstices therein all of which are filled with said liquid vehicle and free of occluded gases thereby preventing the occlusion of gases in each layer during the building-up process, and bonding the particles of said composite body to one another.

2. The method of preparing an electrical unit comprising a composite body including a plurality of layers of materials having specific electrical properties which method comprises building up a plurality of superimposed layers of fluid suspensions, in liquid vehicles, of particles of a material having specific electrical properties, the first of said layers being applied to a support and each succeeding layer being applied to the preceding layer formed, removing the portion of the liquid vehicle content of each layer in excess of that present at the point of saturation of said layer with said liquid vehicle after it is formed into an immobile layer and before applying a succeeding layer of a fluid suspension to produce an immoble layer of said particles dispersed in said liquid vehicle, said immoblie layer of particles having interstices therein all of which are filled with the remainder of said liquid vehicle and free of occluded gases thereby preventing the occlusion of gases in each layer during the building-up process, and bonding the particles of said composite body to one another.

3. The method of claim 2 wherein from 25% to 60%, by weight, of the liquid vehicle in each layer is removed before applying a succeeding layer of said fluid suspension.

4. The method of preparing an electrical unit comprising a composite body including a plurality of layers of materials having specific electrical properties which method comprises building up a plurality of superimposed layers of fluid suspensions in liquid vehicles, of particles of a material having specific electrical properties, the first of said layers being applied to a support and each succeeding layer being applied to the preceding layer formed, applying an absorbent material to each layer after it is formed to absorb a portion of the liquid vehicle therein and thereby adjust the liquid content of each layer to the point of saturation of said layer with said liquid vehicle to produce an immobile layer of said particles dispersed in said liquid vehicle, said immobile layer of particles having interstices therein all of which are filled with said liquid vehicle and free of occluded gases thereby preventing the occlusion of gases in each layer during the building-up process, removing said absorbent material from each layer before applying a succeeding layer of a fluid suspension, and bonding the particles of said composite body to one another.

5. The method of claim 4 wherein from 25% to 60%, by weight, of the liquid vehicle in each layer is absorbed by said adsorbent material applied thereto.

6. The method of preparing an electrical unit comprising a composite body including a plurality of layers of materials having specific electrical properties which method comprises building up a plurality of superimposed layers of fluid suspensions, in liquid vehicles, of particles of a material having specific electrical properties, the first of said layers being applied to a support and each succeeding layer being applied to the preceding layer formed, adjusting the liquid vehicle content of each layer to the point of saturation of said layer with said liquid vehicle after it is formed and before applying a succeeding layer of a fluid suspension by permitting the liquid vehicle content of each layer to migrate into the previously formed layers of substantially lower vehicle content to produce an immobile layer of said particles dispersed in said liquid vehicle, said immobile layer of particles having interstices therein all of which are filled with said liquid vehicle and free of occluded gases thereby preventing the occlusion of gases in each layer during the building-up process, and bonding the particles of said composite body to one another.

7. The method of preparing an electrical unit comprising a composite body including a plurality of layers of materials having specific electrical properties which method comprises building up a plurality of superimposed layers of fluid suspensions, in liquid vehicles, of particles of material having specific electrical properties, the first of said layers being applied to a support and each succeeding layer being applied to the preceding layer formed, evaporating that portion of the liquid vehicle content of each layer which is in excess of that present at the point of saturation of said layer with said liquid vehicle after it is formed into an immobile layer and before applying a succeeding layer of a fluid suspension to produce an immobile layer of said particles dispersed in said liquid vehicle, said immobile layer of particles having interstices therein all of which are filled with the remainder of said liquid vehicle and free of occluded gases thereby preventing occlusion of gases in each layer during the building-up process, and bonding the particles of said composite body to one another.

8. The method of claim 7 wherein from 25% to 60%, by weight, of the liquid vehicle is evaporated from each layer before the next succeeding layer of said fluid suspension is applied thereto.

9. The method of claim 7 wherein said first layer of said fluid suspension is applied to a porous support and said portion of liquid vehicle evaporated from each layer is transmitted through said porous support.

10. The method of preparing an electrical unit comprising a composite body including a plurality of layers of materials having specific electrical properties which method comprises building up a plurality of superimposed layers of fluid suspensions, in liquid vehicles, of particles of material having specific electrical properties, the first of said layers being applied to a porous support and each succeeding layer being applied to the preceding layer formed, applying an absorbent material to each layer after it is formed to absorb a portion of the liquid vehicle therein and simultaneously permitting another portion of the liquid vehicle therein to migrate through said porous support to adjust the liquid content of each layer to the point of saturation of said layer with said liquid vehicle to produce an immobile layer of said particles dispersed in said liquid vehicle, said immobile layer of particles having interstices therein all of which are filled with said liquid vehicle and free of occluded gases thereby preventing the occlusion of gases in each layer during the building-up process, removing said absorbent material from each layer before applying a succeeding layer of a fluid suspension, and bonding the particles of said composite body to one another.

11. The method of preparing an electrical unit comprising a composite body including a plurality of relatively thick and relatively thin layers of materials having specific electrical properties which method comprises building up a plurality of relatively thick and relatively thin superimposed layers of fluid suspensions, in liquid vehicles, of particles of material having specific electrical properties, the first of said layers being applied to a support and each succeeding layer being applied to the preceding layer formed, removing the portion of the liquid vehicle content of each thick layer in excess of that present at the point of saturation of said layer with said liquid vehicle after it is formed into an immobile thick layer and before applying a succeeding layer of a fluid suspension to produce an immobile thick layer of said particles dispersed in said liquid vehicle, permitting the portion of the liquid vehicle content of each thin layer in excess of that present at the point of saturation of said thin layer with said liquid vehicle after it is formed into an immobile thin layer and before applying a succeeding layer of a fluid suspension to migrate through the preceding layers formed to produce an immobile thin layer of said particles dispersed in said liquid vehicle, said immobile thick and thin layers each having interstices therein all of which are filled with the remainder of said liquid vehicle and free from occluded gases thereby preventing the occlusion of gases in each layer during the building-up process, and bonding the particles of said composite body to one another.

12. The method of preparing an electrical unit comprising a composite body including a plurality of relatively thick and relatively thin layers of materials having specific electrical properties which method comprises building up a plurality of relatively thick and relatively thin superimposed layers of fluid suspensions, in liquid vehicles, of particles of materials having specific electrical properties, the first of said layers being applied to a porous support and each succeeding layer being applied to the preceding layer formed, removing the portion of the liquid vehicle content of each thick layer in excess of that present at the point of saturation of said layer with said liquid vehicle after it is formed into an immobile thick layer and before applying a succeeding layer of a fluid suspension to produce an immobile thick layer of said particles dispersed in said liquid vehicle, permitting the portion of the liquid vehicle content of each thin layer in excess of that present at the point of saturation of said thin layer with said liquid vehicle after it is formed into an immobile thin layer and before applying a succeeding layer of a fluid suspension to migrate through the preceding layers formed and said porous support, to produce an immobile thin layer of said particles dispersed in said liquid vehicle, said immobile thick and thin layers each having interstices therein all of which are filled with the remainder of said liquid vehicle and free from occluded gases thereby preventing the occlusion of gases in each layer during the building-up process, and bonding the particles of said composite body to one another.

13. The method of building an electrical capacitor of the type comprising a plurality of fired vitreous enamel dielectric layers separating fired silver electrode layers which comprises, building up on a support a plurality of superimposed layers of particles of vitreous enamel dielectric material and powdered silver, each suspended in liquid vehicles, each layer of said vitreous enamel being sufficient in extent to serve for a number of capacitor units, removing a portion of the liquid vehicle from each vitreous enamel layer after it is laid down to form a hard immobile layer of particles of vitreous enamel having the interstices between said particles filled with said liquid vehicle and free of occluded gases, each layer of said metallic silver being applied in the form of a pattern providing electrode areas for a number of capacitors and interconnections between electrodes within individual units and terminals at the edges of the capacitor units, allowing the liquid vehicle content of said layer of metallic silver suspension to migrate into and come to equilibrium with the liquid vehicle content of the preceding vitreous enamel layer, continuing this process to build up alternate layers of vitreous enamel and layers of metallic silver until the required number of silver layers separated by vitreous enamel layers has been built-up, cutting the structure apart directly through the layers thereof to provide a number of capacitor units and then firing the resulting individual capacitor units cut-off from the main body to provide unitary monolithic electrical capacitors.

14. The method of preparing electrical capacitors set forth in claim 13 wherein the liquid vehicle is removed from each vitreous enamel layer by applying an absorbent material to the surface thereof and removing said absorbent material before applying a succeeding layer.

15. The method of preparing an electrical unit comprising a composite body including a plurality of layers of materials having specific electrical properties which method comprises building up a plurality of superimposed layers of fluid suspensions, in liquid vehicles, of particles of a material having specific electrical properties, the first of said layers being applied to a flexible support and each succeeding layer being applied to the preceding layer formed, adjusting the liquid vehicle content of each layer to the point of saturation of said layer with said liquid vehicle after it is formed and before applying a succeeding layer of a fluid suspension to produce an immobile layer of said particles dispersed in said liquid vehicle, all of which are filled with said liquid vehicle and free of occluded gases thereby preventing the occlusion of gases in each layer during the building-up process, cutting the plurality of layers thus formed transversely without cutting said flexible support to produce at least two composite bodies, and bonding the particles in each of said composite bodies to one another.

16. The method of preparing an electrical unit comprising a composite body including a plurality of layers of materials having specific electrical properties which method comprises building up a plurality of layers of a fluid suspension of a syntheic resin-forming material having specific electrical properties, the first of said layers being applied to a support and each succeeding layer being applied to the preceding layer formed, chemically reacting a portion of said synthetic resin-forming material before applying a succeeding layer of a fluid suspension to provide an immobile layer of synthetic resinous particles, said immobile layer of particles having interstices therein all of which are filled with fluid suspension and free of occluded gases thereby preventing occlusion of gases in each layer during the building-up process, and thereafter chemically reacting the remaining fluid suspension in each of said layers to bond said particles of said composite body to one another.

17. The method of claim 16 wherein said fluid suspension consists essentially of a fluid partially condensed synthetic resinous material and a portion of said resinous material in each layer is condensed to provide an immobile layer of synthetic resinous particles before applying the next succeeding layer of a fluid suspension.

18. The method of claim 16 wherein said fluid suspension consists essentially of a fluid partially polymerized synthetic resin material and a portion of said resinous material in each layer is polymerized to provide an immobile layer of synthetic resinous particles before applying the next succeeding layer of fluid suspension.

References Cited in the file of this patent

UNITED STATES PATENTS

| | | |
|---|---|---|
| 2,385,573 | Hommel | Sept. 25, 1945 |
| 2,389,419 | Deyrup | Nov. 20, 1945 |
| 2,389,420 | Deyrup | Nov. 20, 1945 |
| 2,531,389 | Brandt | Nov. 28, 1950 |